INVENTORS.
Paul Junior Wilhoit &
Gerald Kenneth Miller,
BY Paul & Paul
ATTORNEYS.

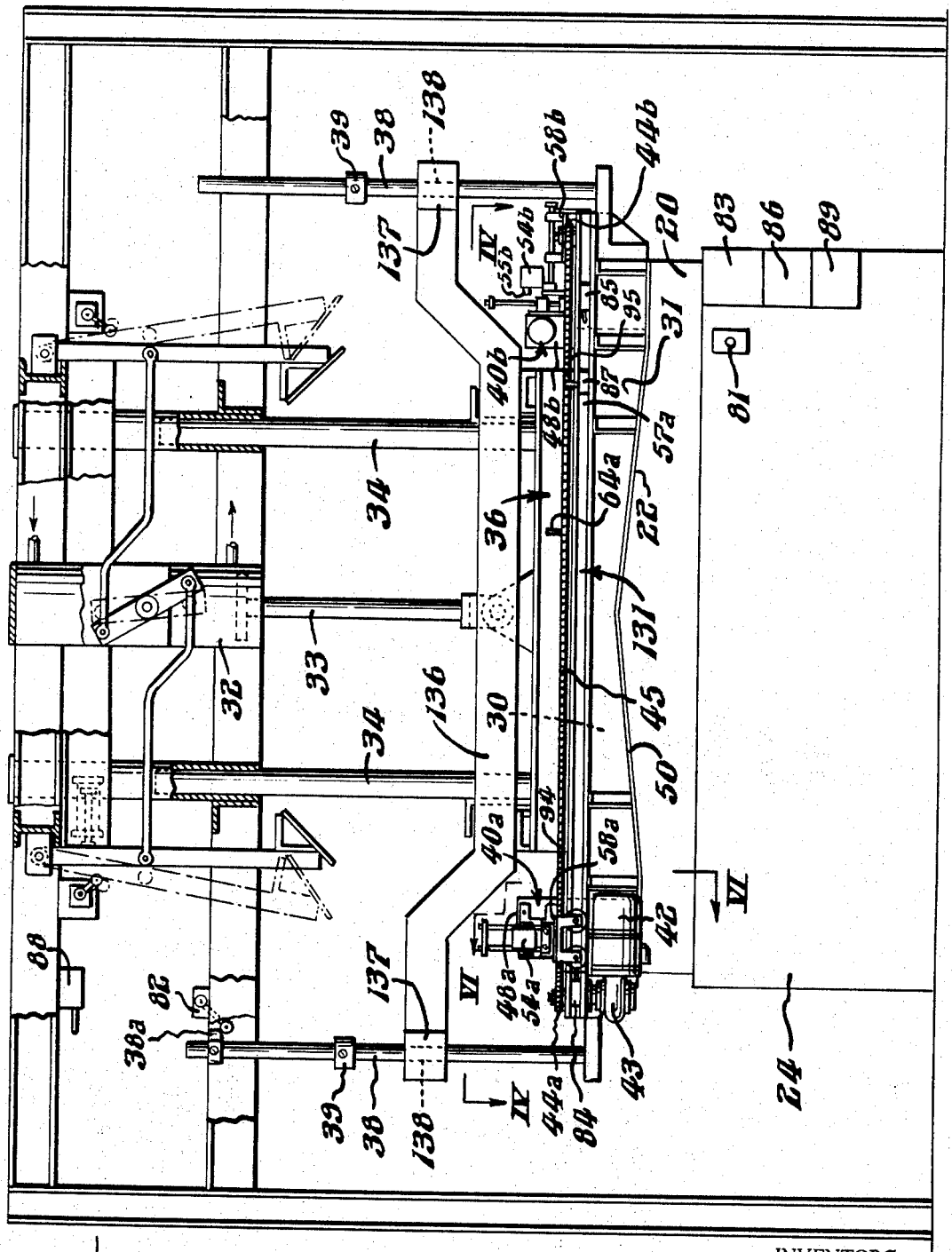

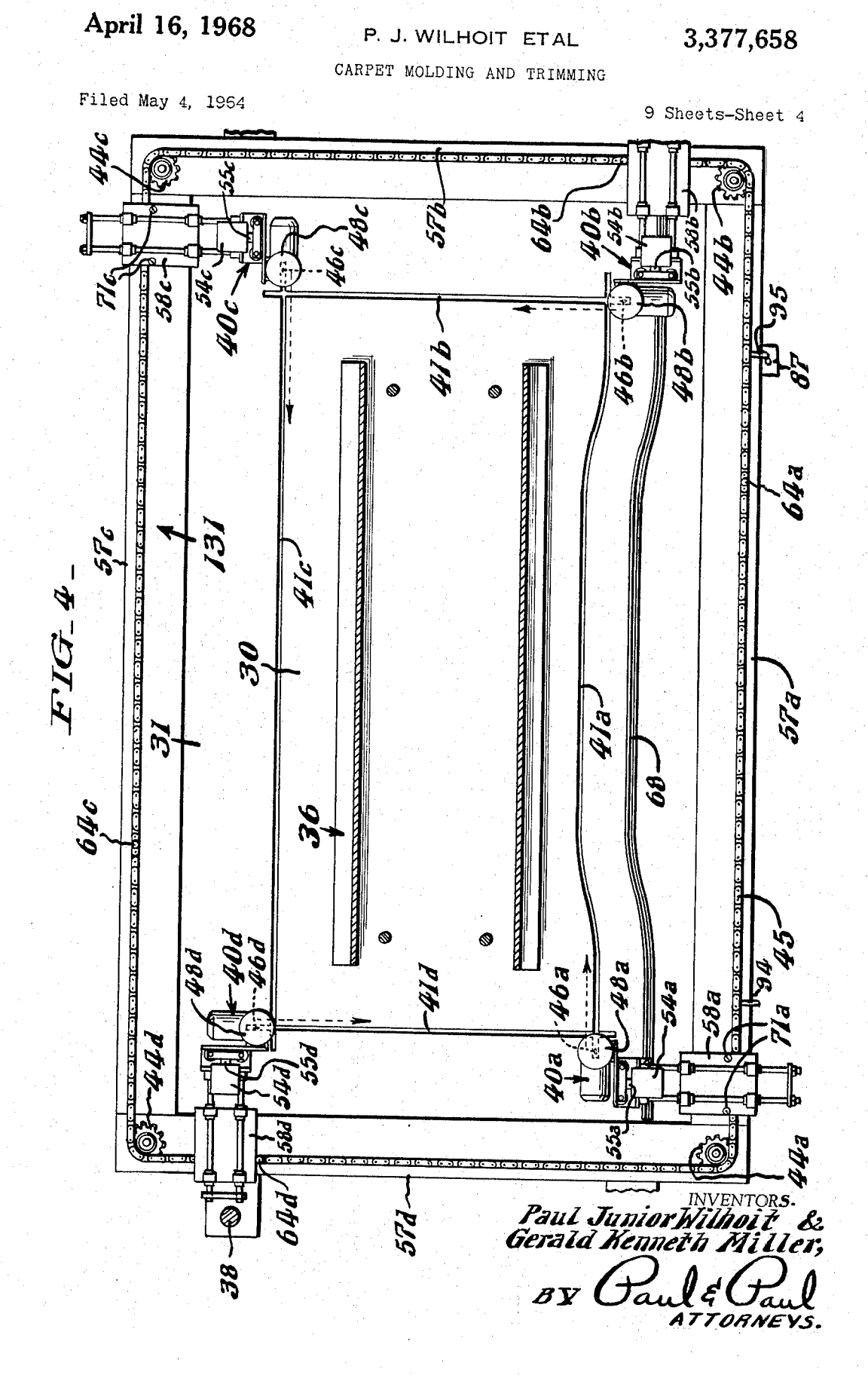

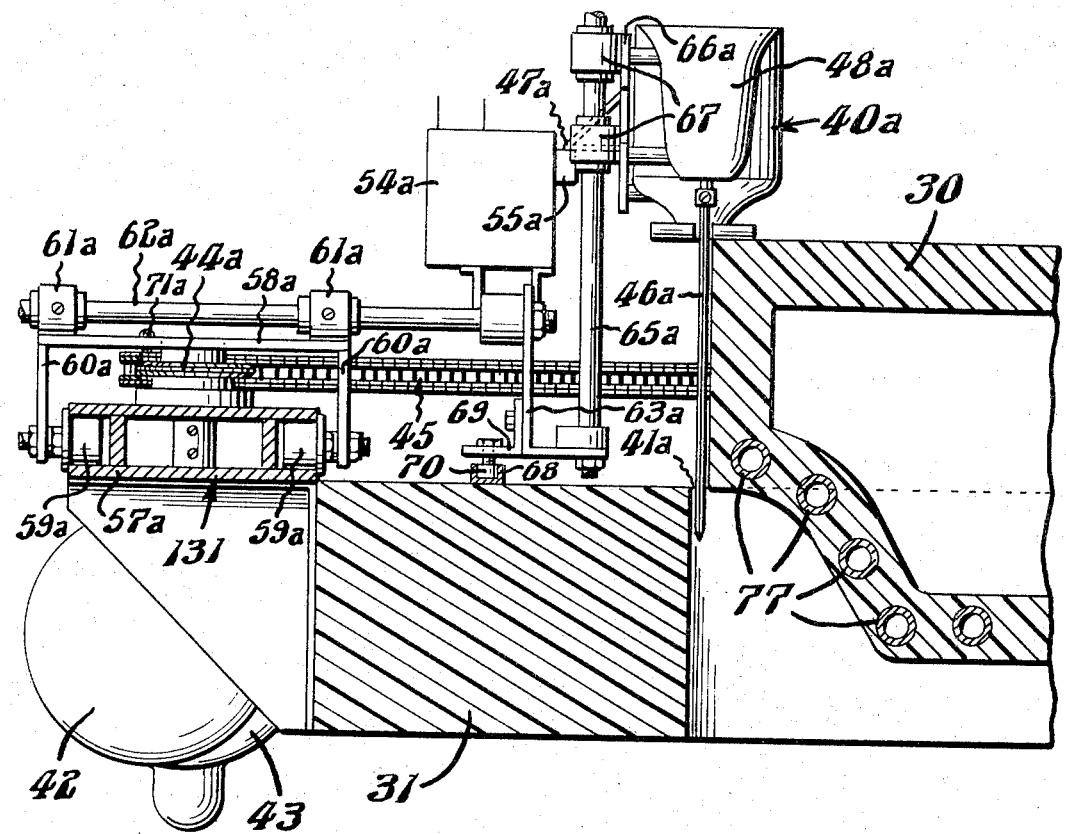

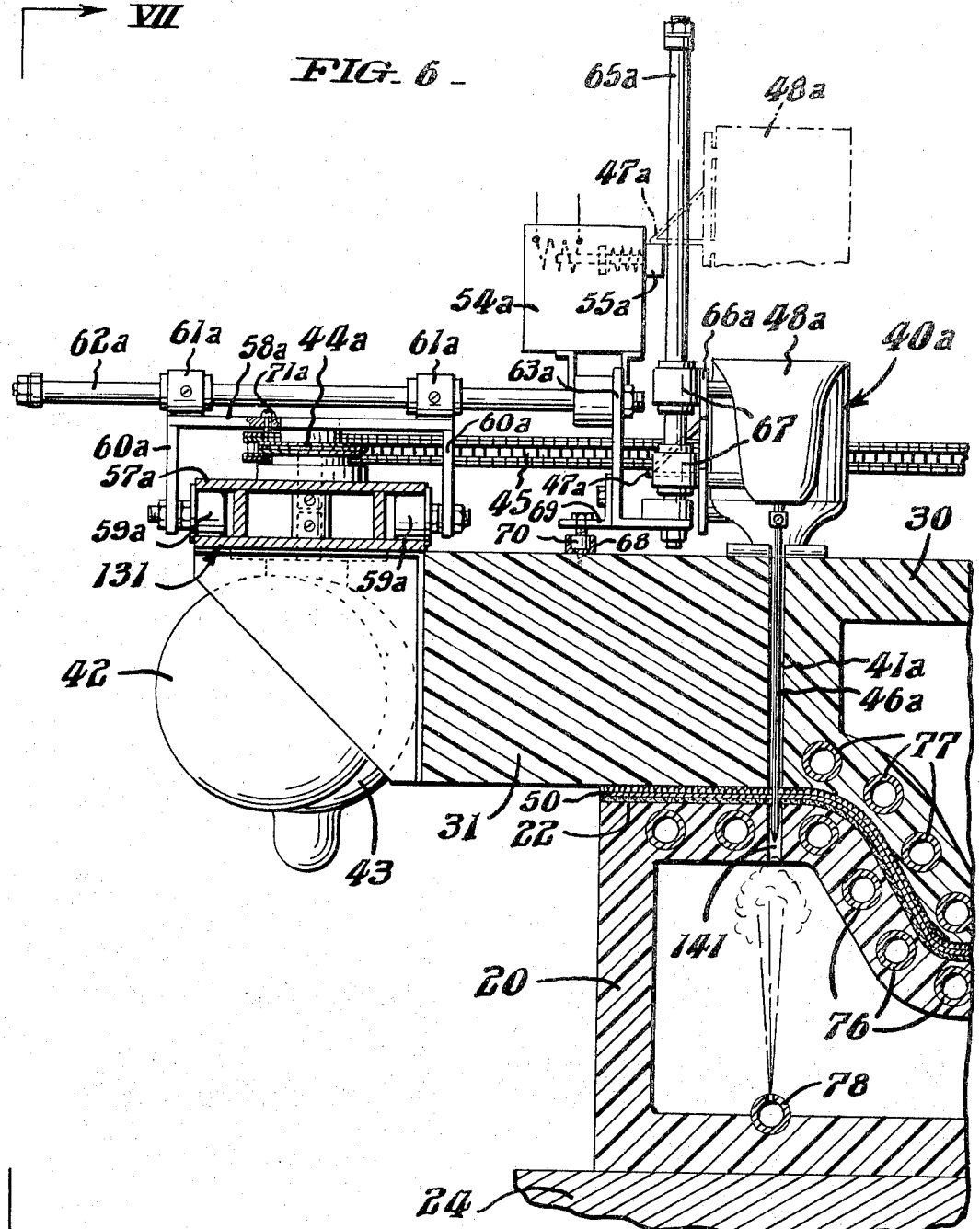

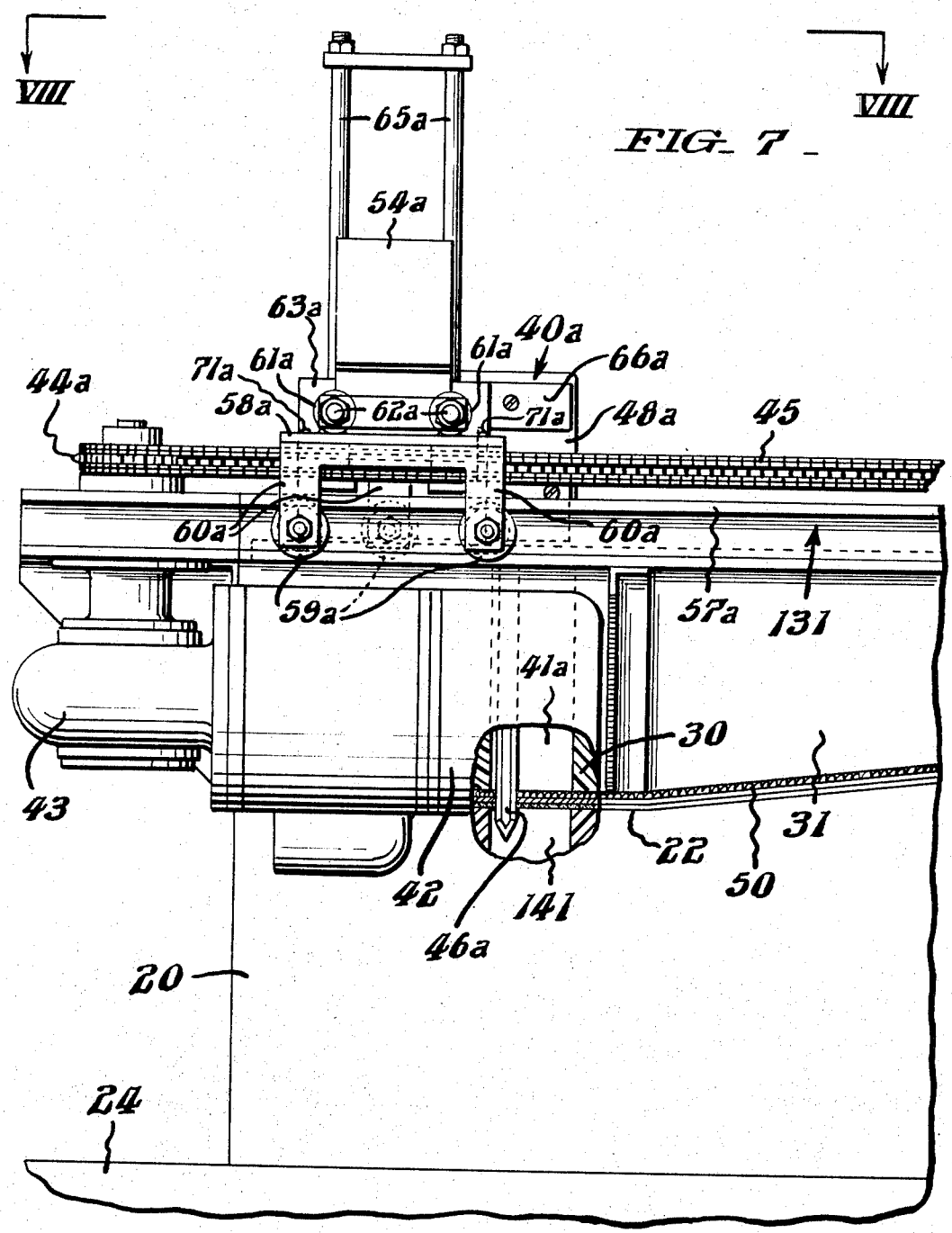

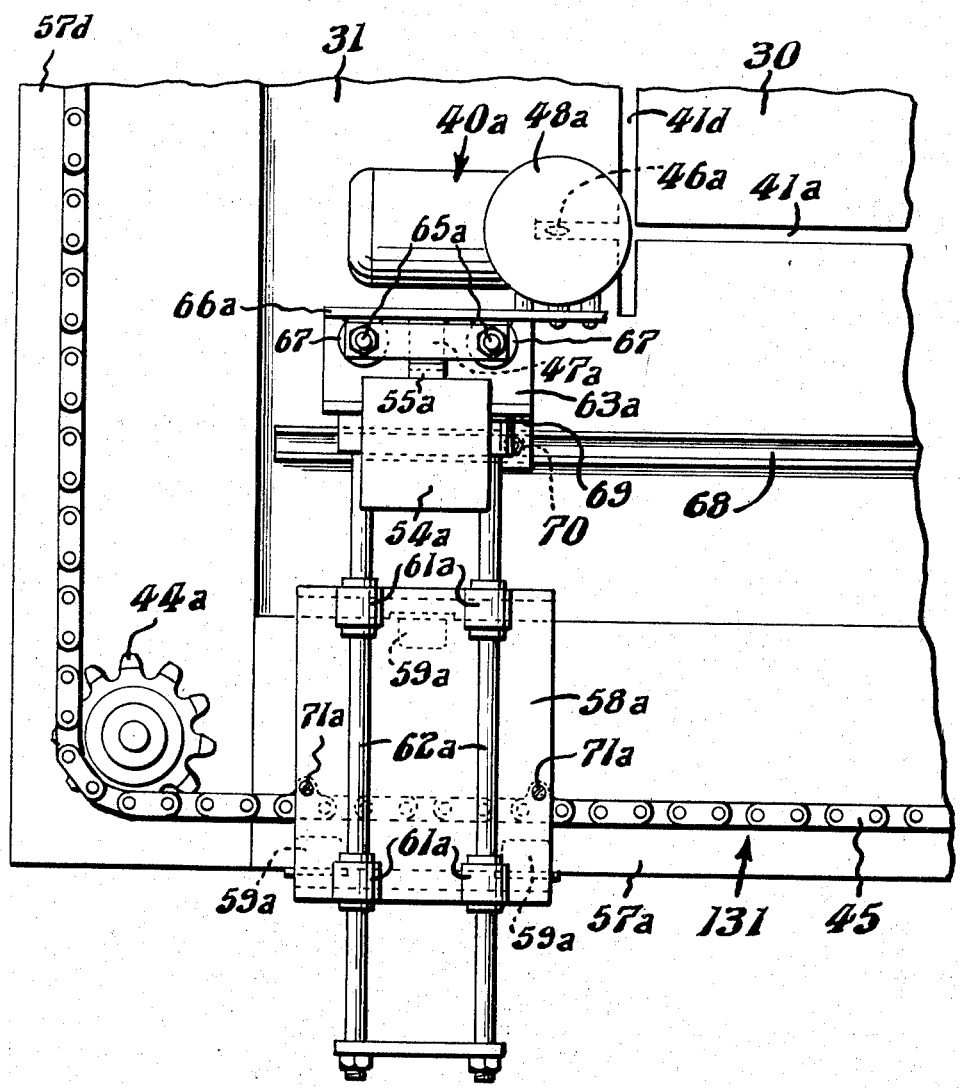

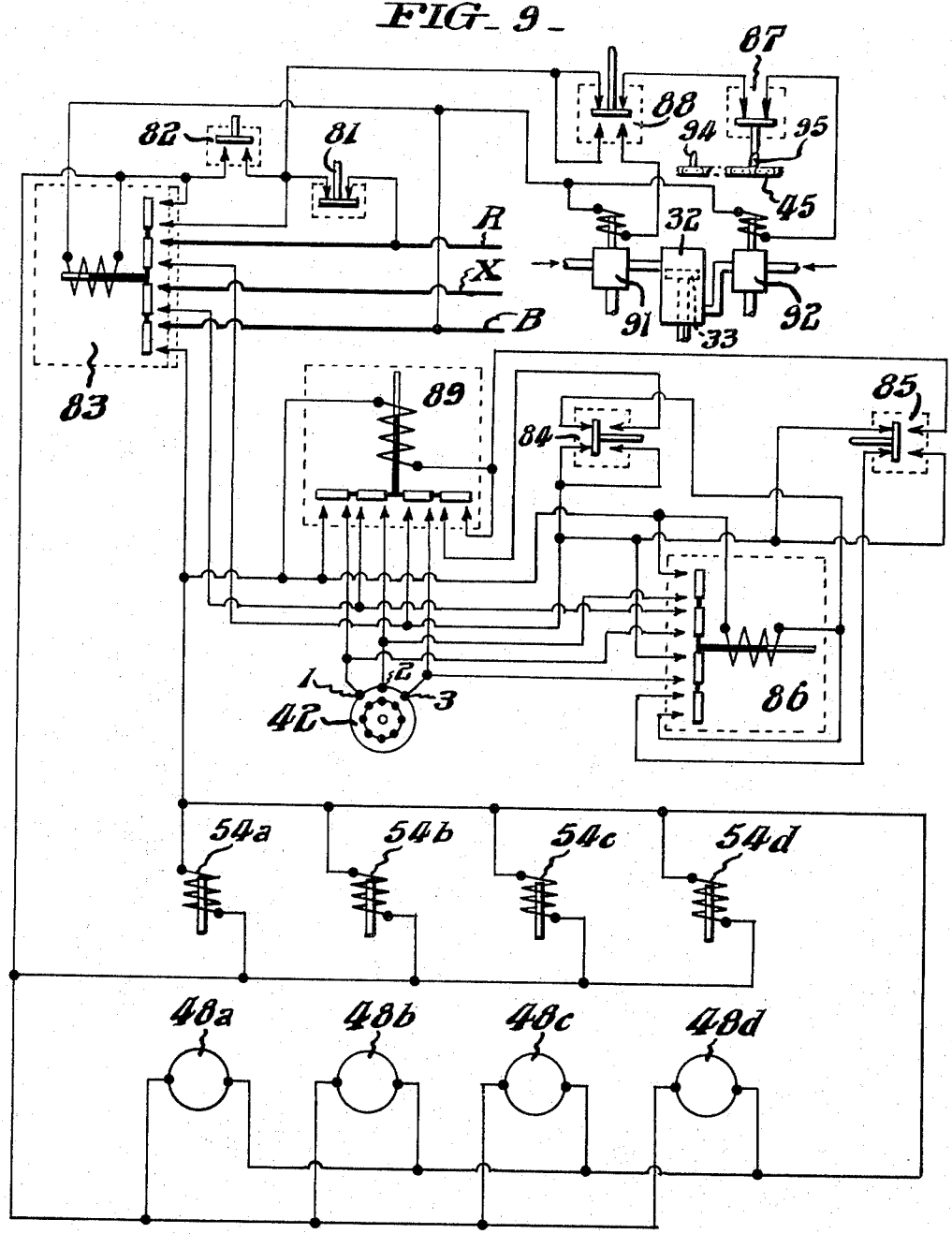

United States Patent Office 3,377,658
Patented Apr. 16, 1968

3,377,658
CARPET MOLDING AND TRIMMING
Paul Junior Wilhoit, Albemarle, and Gerald K. Miller, New London, N.C., assignors to Collins and Aikman Corporation, New York, N.Y., a corporation of Delaware
Filed May 4, 1964, Ser. No. 364,714
10 Claims. (Cl. 18—19)

ABSTRACT OF THE DISCLOSURE

A carpet press mold and trimmer is disclosed for molding contour-matching floor carpets for automobiles. The press has a fixed lower mold and an elevatable upper mold each of which includes a continuous cutting slot which follows a generally rectangular path defining the periphery of the carpet. The cutting slots are in alignment when the mold is closed. At least one, and preferably four, travelling cutters project into the aligned slots and travel therealong to trim the carpet while it is still in the mold. A compression ring located outside the cutting slot holds the peripheral portions of the carpet down during cutting. Each cutter is carried by a travelling carriage carried by an endless chain.

---

This invention relates to carpet molding, particularly the molding of floor carpets for the front and rear floors of automobiles.

Automobiles of modern design are characterized by floors which are contoured, rather than flat. In a typical case, for example, the floor is low, rising at the sides to the ledges at the doors. There is a central hump forming therebeneath a tunnel for the transmission or drive shaft. The front floor probably has an upwardly inclined forward surface.

It is conventional to mold a floor carpet having a contour matching that of the floor of the automobile, so that upon assembly of the automobile, the floor carpet may be quickly laid in place. Such floor carpets usually have a polyethylene or other thermoplastic coating applied to the back of the carpet prior to molding. This coating is fused to the carpet backing. In addition, a jute pad backing may be fused to the back of the carpet during the molding operation. This jute backing is ordinarily applied to only a portion of the total area of the carpet.

It is conventional to mold automobile floor carpets in final form so far as surface contour is concerned but not so far as peripheral outline is concerned. Conventionally, the molded carpet is removed from the press mold and trimmed outside of the mold to the desired peripheral outline and dimensions.

Efforts have been made by the prior art to die cut the peripheral edges of the molded carpet while still in the press mold, but this has not been satisfactory. In a typical case, pressures of the order of 100 pounds per lineal inch would be required to die cut the heavy pile floor carpet. To provide a pressure of this magnitude in a mold would require an extremely strong and heavy mold, and the cost thereof would be prohibitive.

Accordingly, it has been conventional practice to remove the molded carpet from the press mold manually, to transfer it to a trimming table, and to there manually trim the carpet to the outline and dimensions desired. Such manual trimming operations, however, have at least two disadvantages, namely, inaccuracy and the high cost of the manual labor.

The inaccuracy of trim arises from two causes. First, the guide lines at the trimming table will produce an accurate trim only if the molded carpet is accurately located on the cutting table. This requires considerable care. It frequently happens that the molded carpet is not correctly placed manually on the trimming table. Hence, even if the cutting operator follows the guide lines accurately, the carpet will nevertheless be incorrectly cut. Secondly, it is conventional at the trimming table to clamp only some portions of the molded carpet, all of the clamped areas being inside the cutting lines. The areas outside the cutting lines are not clamped, since to do so would interfere with the manual cutting operation. Consequently, the outside portions are free to slide around during the cutting operation, and this tends to cause cutting errors.

A principal object of the present invention is to provide means for trimming a molded carpet accurately, yet inexpensively.

Another object is to provide apparatus for molding an automobile floor carpet which assures accuracy of trim, and at the same time is less costly than the manual method conventionally employed.

Another object is to provide an apparatus for trimming the molded carpet without removing it from the press mold, thereby increasing the accuracy of the trim.

A further object is to provide an apparatus for trimming a molded carpet while still in the press mold, in which the outer to-be-trimmed-off portion, as well as the central portion, is clamped, thereby increasing the accuracy of the trim.

Still another object is to provide molding and cutting apparatus, of the type referred to above, in which means are provided for speeding up the cooling and setting of the polyethylene (or other thermoplastic) backing, at least along the cutting lines, thereby to facilitate cutting promptly after molding.

These and other objects are achieved, in accordance with the present invention, by providing a press mold having at least one (preferably four) travelling cutters incorporated into the mold, and by providing, in the press mold, means for cooling the trim line prior to and during cutting.

In the drawing:

FIG. 3 is a front elevation showing the prese mold in closed position;

FIG. 4 is a plan view looking down along the line IV—IV of FIG. 3;

FIG. 5 is a side elevation, partly in section, looking out from the left corner of the apparatus along the line V—V of FIG. 1, showing a corner of the press mold in open position, and showing the cutter in the "up" position, mounted on the compression ring bracket;

FIG. 6 is a side elevation, partly in section, looking out from the left corner of the apparatus along the line VI—VI of FIG. 3, showing a corner of the mold in closed position and the cutter in the lowered or "down" position;

FIG. 7 is a front elevation, partly in section, of the left corner of the apparatus looking along the line VII—VII of FIG. 6;

FIG. 8 is a plan view of the front left corner of the apparatus looking down along the line VIII—VIII of FIG. 7; and FIG. 9 is a schematic of one form of electrical control circuit which may be used to control the operation of the cutters.

Figure 1:
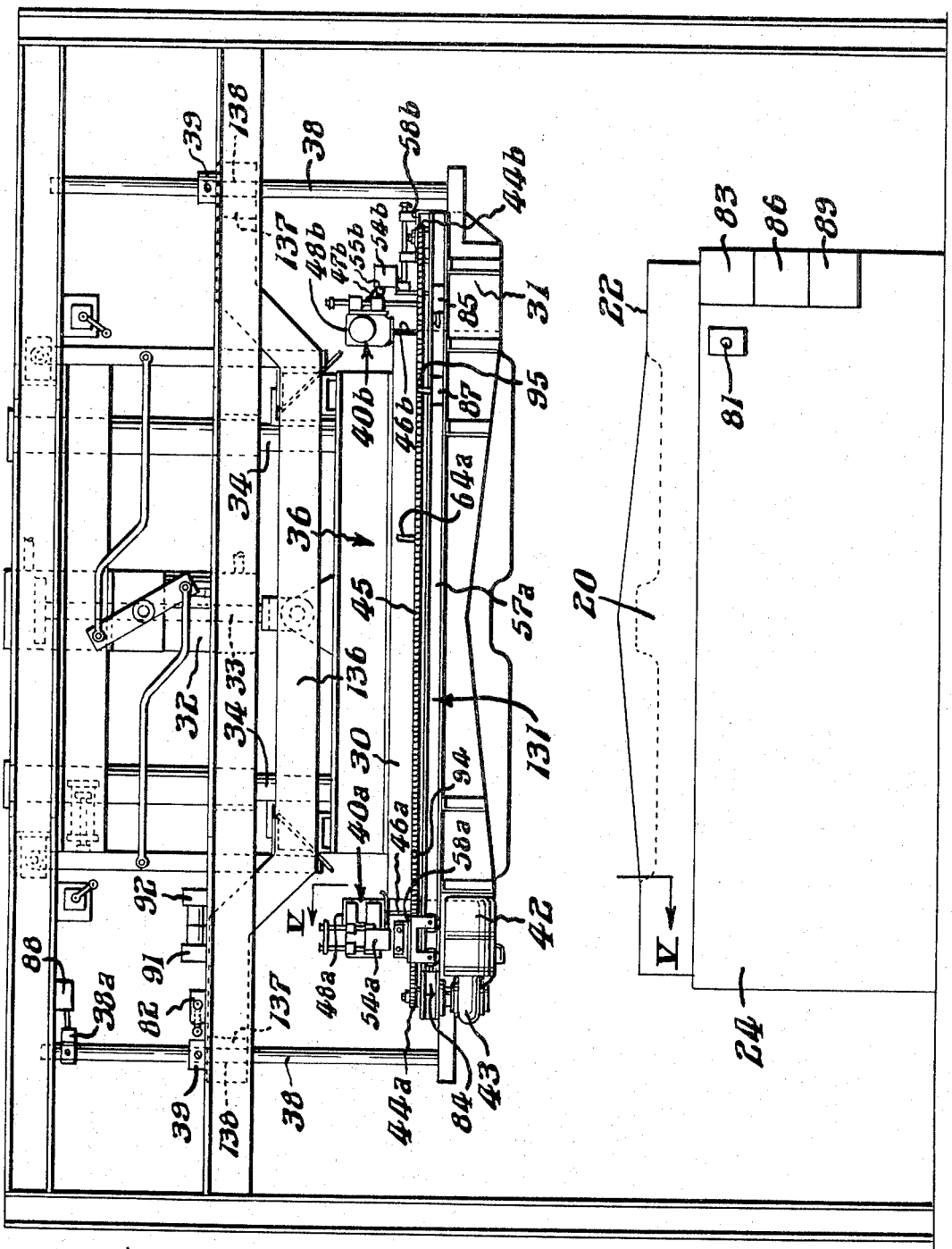
FIG. 1 is a front elevation showing the press mold in open position.
Figure 2:
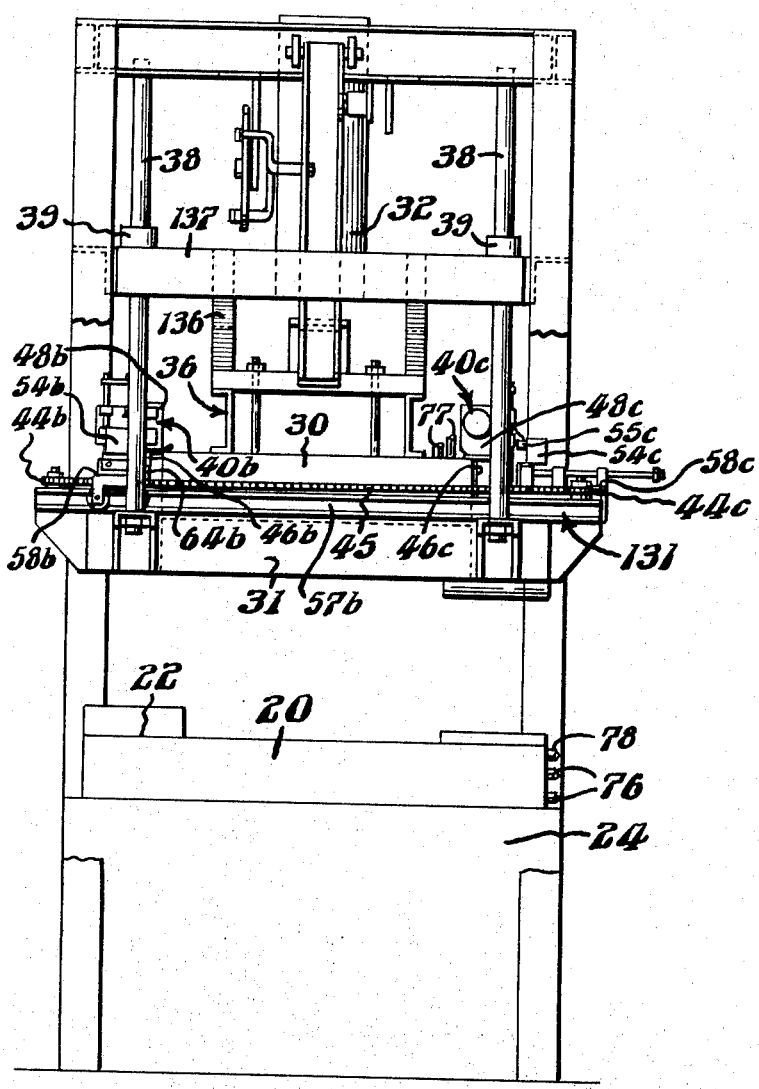
FIG. 2 is a side elevation of the press mold in open position.

Referring now to FIG. 1, the press mold thereshown includes a lower female mold element 20 supported by a table 24. For the purpose of describing the present invention, the carpet mold may be assumed to be of generally rectangular cross section horizontally. The lower or female mold element 20 has two depressed regions separated by a ridge, and is surrounded by a rectangular peripheral ledge 22. The ledge on the short sides may be assumed to be flat, but on the long sides, particularly at the front, the ledge rises to a central crest.

Supported above the lower female mold element 20 is an upper male mold element 30, also of generally rectangular cross section horizontally and having a surface contour adapted to mate with that of the female mold element 20. Surrounding the male mold element 30 is a rectangular peripheral compression ring 31 having a surface contour adapted to mate with the ledge 22 of the female mold. The male mold element 30 and the compression ring 31 are supported from an elevator carriage 36 which is lowered and raised by a fluid-pressure (pneumatic or hydraulic) cylinder 32 having a piston 33 to the end of which the carriage 36 is pivotally connected. Telescoping guide rods 34 and in guiding the elevator carriage 36.

The male mold element 30 is fixed to the underside of the elevator carriage 36. The compression ring 31 is also supported by the elevator carriage 36, but in a floatable manner. Carriage 36 has an upper deck 136 having arms 137 extending outwardly therefrom. Vertical rods 38 pass through holes 138 in the arms 137. The rods 38 have a diameter somewhat smaller than that of the holes 138 so that the rods 38 are freely slidable vertically with respect to the arms 137.

Mounted on the four-part shelf 131 which extends all the way around the compression ring 31 are four travelling cutters 40a, 40b, 40c, and 40d. Each of these four cutters is arranged to travel along one side of the generally rectangular mold, as indicated by the dotted-line arrows in FIG. 4.

When the press mold is closed, the upper male mold element 30 is separated from the surrounding compression ring 31 by a continuous slot or groove through which the vertically-disposed blades of the cutters travel. This continuous slot follows a rectangular path and may be conveniently referred to as made up of four separate slots, 41a, 41b, 41c, and 41d, one on each side of the mold, as seen best in the plan view of FIG. 4. The lower female mold element 20 is provided with a continuous slot 141 which follows a rectangular path identical to that of the upper slot. When the press mold is closed, the upper and lower slots are in alignment, as seen in FIG. 6.

Since the mold being described is assumed to be generally rectangular in horizontal cross section, the slots 41a and 41c which run along the front and back of the mold are long relative to the slots 41b and 41a which run along the two sides.

While each of the four cutters 40a, 40b, 40c, and 40d could be moved by separate and independent drive means, we have found it convenient to use a single reversible drive motor 42 to effect travel of all four cutters. This drive motor 42 is shown in FIGS. 5 and 6 to be suspended from the shelf 131 at the left front corner of the compression ring. Motor 42 drives, through a gear-reducing mechanism 43, a sprocket 44a mounted on shelf 131 at the same corner of the compression ring 31 as motor 42. At each of the other three corners of the compression ring, idler sprockets 44b, 44c, and 44d are similarly mounted on the shelf 131.

Running around shelf 131 is an endless chain 45, supported by the four sprockets 44a, 44b, 44c, and 44d, and driven by the drive sprocket 44a and motor 42.

In view of the front and rear slots 41a and 41c being considerably longer than the two side slots 41b and 41d, provision is made for delaying the start of travel of the two cutters, 40b and 40d, which travel the short sides. These two cutters do not start to move until sometime after the start of the two cutters, 40a and 40c, which travel the long front and back slots. All four cutters finish cutting at the same time. The details of the structural arrangement by which this is accomplished will be described later. At this time, it will merely be pointed out that the cutters 40a and 40c, which travel along the long front and back slots 41a and 41c, are fixed directly to the endless chain 45, whereas the cutters 40b and 40d, which travel along the short sides, are not fixed to the chain 45; rather, they are pushed along, after the desired delay, by push pins 64a, 64b, 64c, 64d, fixed to the endless chain 45 at the proper locations.

So far as the broad concept of the present invention is concerned, the travelling cutters 40a, 40b, 40c, and 40d may be of any suitable type. One suitable type is illustrated. The type illustrated has a vertically-disposed double-edged cutting blade, 46a, 46b, 46c, and 46d, respectively, each driven in a reciprocating manner by an oscillating motor 48a, 48b, 48c, and 48d, respectively. However, as discussed later, reciprocation of the cutter blades is not essential. The blades are double-edged since, in the embodiment being described, the cutters travel in opposite directions on alternate trimming operations. The cutters could, however, be arranged to cut in one direction only.

In the apparatus being described, each of the four cutters 40a, 40b, 40c, 40d, is similar, and accordingly, it will only be necessary to describe but one. Cutter 40a, located at the front left corner of the mold and clearly seen in FIGS. 5, 6, and 8, will be described.

In FIG. 5, the positions of the cutter 40a and its blade 46a are shown relative to the positions of the male mold element 30 and compression ring 31 when the press mold is in the open position. The cutter and blade are in the "up" position.

When the press mold is to be closed, the carriage 36 is lowered, thereby lowering the upper mold element 30 and the compression ring 31. The compression ring 31 meets the peripheral ledge 22 of the female mold element 20 just before the male mold element 30 engages the carpet which is stretched across the female mold element 20. As soon as the compression ring 31 meets the ledge 22, the full weight of the compression ring is placed on the peripheral portions of the carpet to be molded. The compression ring 31 is no longer supported by the deck 136 of carriage 36 since the stops 39 no longer rest on the arms 137. The weight of the compression ring 31 on the outer peripheral portions of the carpet places the carpet during molding under tension. This tends to prevent wrinkles and folds from forming, as the carpet is pressed down into the recesses of the female mold element 20 by the projections of the male mold element 30.

When the press mold first completely closes, i.e., when the compression ring 31 and the upper male mold element 30 mate with the lower female mold element 20, all cutters and cutter blades, such as cutter 40a and blade 46a, are still held in the raised or "up" position, as by the plunger 55a of solenoid 54a, shown in FIG. 6. This "up" position is indicated in FIG. 6 by the dotted-line representation. The cutter 40a and blade 46a do not drop until the solenoid 54a is actuated, which is shortly after the press mold has completely closed. Actuation of the solenoid 54a pulls the stop 55a from under the projection 47a of the cutter 40a, and the cutter 40a and blade 46a drop. The double-edged blade 46a is sharp and pointed, and when the cutter drops, the blade pierces the carpet 50 in the closed mold. This piercing of the carpet takes place in the offset portion of the cutting slot 41a, as seen in FIG. 4. The action just described also applies to the other three cutters. After the four cutters drop and their blades pierce the carpet in the closed mold at the four corner positions, the drive motor 42 is energized to drive the endless chain 45.

In the particular embodiment illustrated and now being described, each cutter is driven by an oscillating motor, 48a, 48b, 48c, and 48d. These motors impart a reciprocating motion to the blades. While a reciprocating blade motion may be desirable in certain cases, reciprocation of the blade is not essential to the present invention. The reciprocating motion of the blade does have the advantage of presenting a continually new cutting edge to the carpet being cut in the mold. However, in many cases, a straight horizontal drawing of the blade through the carpet in the mold will be adequate. Moreover, in many cases, the carpet in the mold, at least along portions of the cutting line, will have a surface contour which rises and falls in the path of the cutting blade. In such cases, the molded carpet itself will present a changing cutting edge to the cutter blade.

Referring again to FIG. 6, the cutter blade 46a thereshown follows a path of travel along slot 41a. This path, as viewed in FIG. 6, is into and out of the paper. It will be understood that each of the four cutter blades trims the molded carpet at the level of the ledge 22 of the female mold element 20. While the ledge 22 may rise and fall, it does not fall to the level of the floor of the female mold element. Thus, the length of the cutter blade need only be long enough to take care of the change in level of the peripheral ledge 22.

The means by which the cutters are supported and their blades caused to travel along the cutting slots may be of any suitable type. One suitable type is illustrated in the drawing, and will now be described.

Each of the four sections of the shelf 131 (one section runs along each of the four sides of the compression ring 31) is provided with a track, 57a, 57b, 57c, and 57d, for guiding a travelling carriage, 58a, 58b, 58c, and 58d, respectively, horizontally along the upper surface of the shelf 131. On the travelling carriages, the cutters are supported. Each of the four tracks, travelling carriages, and associated structures are similar and, accordingly, it will be necessary to describe but one of them. The track, travelling carriage, and associated structure for cutter 40a is shown in FIGS. 5, 6, 7, and 8, and will be described.

A track 57a is mounted on that section of the shelf 131 which runs across the front of the mold. The track has two opposed channels for guiding rollers 59a which are rotatably secured to legs 60a of the travelling carriage 58a which spans the track 57a.

Mounted on the upper surface of the travelling carriage 58a are four linear bearings (FIG. 8) identified collectively by the numeral 61a, in which a pair of parallel horizontal rods 62a are slidably mounted. Secured to the inward ends of the pair of rods 62a is an L-shaped bracket 63a which projects downwardly and inwardly toward the cutting slot 41a. The bracket 63a supports a pair of vertical rods 65a. Slidably mounted on the vertical rods 65a is a plate 66a to which the cutter 40a and its oscillating motor 48a are fixed. The plate 66a is fixed to a set of four linear bearings 67 adapted to slide along the rods 65a.

It will be seen that the structure shown allows the cutter 40a to be moved in three directions. The cutter is movable up and down on the vertical rods 65a. It is movable inwardly and outwardly on the horizontal rods 62a. And, it is movable transversely across the front of the mold on the travelling carriage 58a.

The other three cutters 40b, 40c, and 40d are similarly mounted on the travelling carriages 58b, 58c, and 58d. However, in the case of a straight cut, the horizontal rods may be fixed.

Referring now to FIG. 4, it will be seen that the front edge of the mold, and hence also the cutting slot 41a which extends across the front of the mold, is a curved line; it is not a straight line. In order to cause the cutter blade 46a to follow the curvatures of the cutting slot 41a, a guide track 68 is mounted along the front on the upper surface of the compression ring 31. The track 68 follows the curvatures of the cutting slot 41a, maintaining an equal distance therefrom. The bracket 63a (FIGS. 5 and 6) is equipped with an auxiliary L-shaped bracket 69 which extends outwardly and to which is affixed a follower roller 70 which follows the path of the guide track 68. Roller 70 causes the bracket 63a, on which the cutter 40a is supported, to move inwardly and outwardly, following the curving path of the cutting slot 40a, the horizontal rods 62a sliding back and forth in the bearings 61a.

Tracks corresponding to guide track 68 may also be mounted along the rear of the mold; and also along the sides, if necessary. In the embodiment illustrated in the drawing, the cutting slots 41b, 41c, and 41d are straight and parallel with the travelling-carriage tracks 57b, 57c, and 57d, respectively. Hence, guide tracks corresponding to track 68 are not necessary in the particular mold illustrated and described.

The travelling carriages 58a and 58c, which travel along the front and back edges of the mold, are fixed directly to the endless chain 45, as by the bolts 71a and 71c. The travelling carriages 58b and 58d, which travel along the short sides of the mold, are not fastened directly to the endless chain 45. These two carriages, 58b and 58d, are pushed along by push pins 64a, 64b, 64c, 64d, secured to the drive chain 45.

In the particular apparatus now being described, the cutters are moved along in one direction, say counterclockwise as viewed in FIG. 4, to trim one carpet in the mold, and are moved in the opposite direction, clockwise in FIG. 4, to trim the next succeeding carpet in the mold. This is accomplished by reversing the drive motor 42 at the end of each cutting stroke. Since the cutting strokes for the cutters 40a and 40c are long, relative to the strokes of cutters 40b and 40d, the start of travel of the cutters 40b and 40d is delayed.

In FIG. 4, a push pin 64a is secured to the drive chain 45 a selected distance along the chain 45 ahead of the travelling carriage 58b. The selected distance corresponds to the difference in length between the long and short cutting slots, 41a and 41b, respectively. Thus, when the drive motor 42 is driven in a direction to move the chain 45 counter-clockwise, as viewed in FIG. 4, the travelling carriages 58a and 58c start to move immediately, but the carriages 58b and 58d do not move until the push pins 64a and 64c strike the carriage 58b and 58d, respectively.

During the time that the push pins 64a and 64c are approaching the then immobile carriages 58b and 58d, respectively, the push pins 64b and 64d, on the other side of the carriages 58b and 58d, are being carried away from these carriages; and, at the end of the cutting stroke, when the carriages 58b and 58d arrive at the upper right and lower left corners, respectively, of the mold as viewed in FIG. 4, the push pins 64b and 64d are ahead of their respective carriages by a distance, on the endless chain 45, corresponding to the difference in length between the long and short cutting slots. Thus, these pins 64b and 64d, on the reverse or clockwise stroke, afford the necessary delay before moving the carriages 58b and 58d in the reverse direction.

Immediately preceding the molding operation, the carpet blank is heated to an elevated temperature in an oven to melt and fuse the polyethylene (or other thermoplastic) coating to the back of the carpet. The carpet is then molded while still at an elevated temperature. Immediately following molding, while the carpet is still in the mold, the apparatus of the present application provides for trimming the carpet. To facilitate the cutting operation, the apparatus of the present application includes special cooling means. Both the male and female mold elements are water cooled, as indicated in FIG. 6 by the pipes 76 and 77 embedded in the mold elements 20 and 30, respectively. In addition, the female mold element 20 is provided with an air cooling system for projecting jets of relatively cool air (ambient temperature) directly at the underside of the carpet along the cutting line. This is accomplished by an air cooling conduit system which follows the rectangular path of the continuous cutting slot 141 in the female mold. This slot 141 aligns with the upper cutting slots 41a, 41b, 41c, and 41d. A portion of this conduit system is seen in FIG. 6, identified by numeral 78. The upper side of the pipe of the system 78 is provided with perforations or vents, all along the pipe where it lies below the cutting slot 141. Thus, relatively cool air is projected up to the polyethylene-coated undersurface of the carpet, all along the cutting line. This air cooling speeds up the setting of the thermoplastic, along the cutting line, and allows the carpet to be trimmed in the mold substantially immediately following the molding operation.

FIG. 9 is a schematic drawing illustrating one form of electrical control circuit which is suitable for controlling automatically the operation of the travelling cutters.

Switch 81 is a manually operable start-stop switch which is normally closed but which may be opened at any time to de-energize all of the circuits. Switch 82 is actuated by lug 38a on rod 38. When the upper mold element 30 drops, just before the mold becomes fully closed, switch 82 is moved by the lug element 38a to closed position. This completes the electrical circuit from the power lead R to the power lead B through the closed switches 81, 82 and the winding of control relay 83. Control relay 83 is actuated, and its four contacts move to the closed positions.

When the mold closes, switch 88 is moved to the "up" position, but the circuit through this switch is now open at switch 87.

Assume that when the mold closes, the cutters 40a, 40b, 40c and 40d are in the positions shown in FIG. 4, in which the cutter 40a is at the front left corner of the mold. Switches 84 and 85 are normally biased to their right and left hand positions, respectively, but when cutter 40a moves into the left corner, it engages and holds switch 84 in the left hand position, as shown in FIG. 9. Switch 85 is not at this time being engaged by the cutter 40a, and accordingly, switch 85 is in its normal biased left hand position, as shown in FIG. 9.

When control relay 83 is actuated to closed position, power is applied to the cutter motors 48a, 48b, 48c and 48d of the cutters 40a, 40b, 40c and 40d, respectively. Power is also applied to the solenoids 54a, 54b, 54c and 54d, and these solenoids are actuated, thereby allowing the cutters to drop to the "down" position, as indicated in FIG. 6 of the drawing.

Also, when control relay 83 is actuated to closed position, the chain drive motor 42 is energized, and rotates in a direction to drive the chain 45 in a counterclockwise direction, as viewed in FIG. 4. Thus, cutter 40a starts moving to the right.

The electrical circuit which energizes the reversible drive motor 42 may be traced from the power lead R through one of the closed contacts of relay 83, through the closed contacts of switch 84, in the left position as shown in FIG. 9, through the winding of the relay 86, and back to the lead B through the closed contact of the relay 83. Relay 86 is thus energized and its contacts are moved to closed position. This connects the R power lead to terminal 3 of the motor 42, and B power lead to terminal 2 of the motor 42 and the X lead to terminal 1 of the motor 42.

As soon as the cutter 40a leaves its starting position, at the left front corner of the mold, and moves to the right, as described above, switch 84 in FIG. 9 is released and moves to its normal biased right hand position, as viewed in FIG. 9, but this does not break the circuit through relay 86 in view of the hold connection from the R power lead through the closed contacts of the switch 85 and the closed holding contact of the relay 86.

Motor 42 therefore continues to run, to drive chain 45 in a clockwise direction as assumed in the present discussion, until the cutter 40a engages the switch 85 near the right corner of the mold and moves it from the left to the right hand position. When this happens, the circuit through the relay 86 is broken and relay 86 is de-energized. This opens the circuit to the motor 42 and de-energizes the motor. The cutter 40a now coasts into its stop position at the front right corner of the mold. During the action just described, the other three cutters 40b, 40c and 40d have travelled along their respective cutting slots in a manner described previously hereinabove.

Just before the cutter 40a engages switch 85 and moves it from the left to the right hand position, a lug 94 on chain 45 engages switch 87 and moves it from the open to the closed position. Switch 88 is in the "up" position, as previously mentioned, and consequently, when switch 87 is closed by lug 94, as just described, the circuit through the winding of solenoid valve 92 is closed, and the valve opens to admit fluid to cylinder 32 to raise the piston 33. This opens the mold.

When the mold opens, switch 82 is opened and the power lead circuit is broken. When the mold element 30 rises, the cutters 40a, 40b, 40c and 40d are carried to their "up" positions, as illustrated in FIG. 5.

When the upper mold element 30 reaches its upper limit, it actuates switch 88, moving switch 88 from the "up" to the "down" position. This breaks the circuit through the winding of the solenoid valve 92, and completes the circuit through the winding of the solenoid valve 91. Fluid is then admitted to the cylinder 32 to drive the piston 33 downward, and the upper mold element 30 starts its downward movement. Just before the mold closes, and as previously described, element 30 engages and closes switch 82. The circuit through the control relay 83 is thereby again closed, and control relay 83 is energized. All contacts of relay 83 close, the cutter motors 48a, 48b, 48c and 48d are again energized, and the solenoids 54a, 54b, 54c and 54d are again actuated, to drop the cutters to the "down" position, such as is shown in FIG. 6.

The switch 85 is now in the right hand position, being held there by the cutter 40a which is in the right corner position. Switch 84 is in its right hand position, this being its normal biased position. With switch 85 in the right hand position, the circuit is completed through the winding of the relay 89 and relay 89 is energized, thereby closing its contacts. This completes the circuit through drive motor 42, the B power line being connected to the number 1 terminal, the R power line being connected to the number 3 terminal, and the X lead being connected to the number 2 terminal. It will be seen that the B and X leads are now connected at motor 42 in a reverse manner, as compared with their connections to the motor 42 when the drive chain 45 was driven counterclockwise. Hence, the direction of operation of the motor 42 is now reversed, and the motor now rotates in a direction to move the chain 45 in a clockwise direction.

The cutter 40a now leaves its position at the right front corner of the mold and moves toward the left, as viewed in FIG. 4. As soon as the cutter 40a leaves its starting position, switch 85 is released and returns to its normal biased left hand position. However, the circuit through the winding of relay 89 remains unbroken in view of the hold circuit through the contact of switch 84 in the right position. Thus, the drive motor 42 remains energized and the chain 45 continues to move in a clockwise direction.

When cutter 40a arrives at the left corner, it engages switch 84 and moves it to the left hand position, as viewed in FIG. 9. This breaks the circuit through drive motor 42, and the drive motor shuts off. Cutter 40a now coasts to its stop position.

Just before cutter 40a engages switch 84, as described above, lug 95 on chain 45 engages switch 87 and moves switch 87 to closed position. This completes the circuit through the winding of solenoid valve 92, and fluid is admitted to cylinder 32 to drive piston 33 upward. This opens the mold. When the mold element 30 moves upward, switch 82 is opened. This breaks the power circuit to the cutter system. When the mold element 30 reaches its upper limit, switch 83 is moved from the "up" to the "down" position, and the mold again starts to close.

The electrical control circuit shown in FIG. 9, the operation of which is described above, is but one example of a suitable circuit which may be used to control automatically the operation of the cutters.

What is claimed is:

1. A carpet press-mold and trimmer apparatus comprising: upper mold means; lower mold means; means for lowering and raising said upper mold means to close and open the press-mold; a continuous cutting slot in said upper mold means; a continuous cutting slot in said lower mold means, said upper and lower cutting slots being in alignment when the press-mold is closed; travelling cutter means having cutting blade means mounted for projection into said aligned cutting slots when the press-mold is closed; and drive means for causing said cutting blade means to travel along said aligned cutting slots after the press-mold is closed, thereby to trim the carpet in the mold.

2. Apparatus as claimed in claim 1 characterized in that said upper mold means comprises an upper mold element surrounded by a compression ring, and further characterized in that said upper cutting slot is located between said upper mold element and said compression ring.

3. Apparatus as claimed in claim 2 characterized in that the travelling cutter means is supported by said compression ring, and further characterized in that said drive means for causing the cutting blade means to travel along said aligned slots includes an endless chain supported by said compression ring and motor drive means for driving said endless chain.

4. Apparatus as claimed in claim 3 characterized in that each of said upper and lower continuous cutting slots follows a generally rectangular path, and further characterized in that said travelling cutter means comprises four travelling cutters each adapted to have its cutter blade travel along that portion of the continuous cutting slot which forms one side of the generally rectangular path.

5. Apparatus as claimed in claim 4 characterized in that a shelf surrounds said compression ring and is secured thereto, and further characterized in that a track is mounted on said shelf, and in that each of the cutters is mounted on a travelling carriage adapted to travel along said track.

6. Apparatus as claimed in claim 5 further characterized in that means are provided for moving said cutting blades in a vertically reciprocating motion.

7. Apparatus as claimed in claim 6 characterized in that said travelling carriage includes means for moving the cutter blade laterally with respect to said track, thereby to accommodate variations in distance between said track and the cutting slot.

8. Apparatus as claimed in claim 7 characterized in that perforated piping is embedded in said lower mold element for projecting jets of relatively cool air into the open base of the lower cutting slot.

9. Apparatus as claimed in claim 8 characterized in that means are provided for connecting directly to the endless chain the travelling carriages which are adapted to move along the long sides of the rectangular cutting path.

10. Apparatus as claimed in claim 9 further characterized in that the travelling carriages which are adapted to move along the short sides of the rectangular cutting path are free of direct connection to the endless chain, and further characterized in that pusher means for said last-named carriages are connected directly to the endless chain at a spaced distance ahead of said carriages.

References Cited

UNITED STATES PATENTS

| | | |
|---|---|---|
| 2,251,135 | 7/1941 | Iknayan et al. |
| 2,263,474 | 11/1941 | Scheibl _____ 25—105 |
| 2,521,387 | 9/1950 | Maynard et al. _____ 18—19 |
| 2,677,295 | 5/1954 | Schmidt _____ 25—105 X |
| 2,677,747 | 5/1954 | Jaye. |
| 3,240,851 | 3/1966 | Scalora. |

WILLIAM J. STEPHENSON, *Primary Examiner.*